United States Patent
Reiter et al.

(10) Patent No.: US 9,551,098 B2
(45) Date of Patent: *Jan. 24, 2017

(54) NONWOVEN BATT WITH CURVED CARBON FIBER BUNDLES

(75) Inventors: Birgit Reiter, Wackersdorf (DE);
Martin Danzer, Wackersdorf (DE);
Gerald Ortlepp, Uhlstaedt-Kirchhasel (DE)

(73) Assignee: SGL Automotive Carbon Fibers GmbH & Co. KG, Munich (DE)

( * ) Notice: Subject to any disclaimer, the term of this patent is extended or adjusted under 35 U.S.C. 154(b) by 604 days.

This patent is subject to a terminal disclaimer.

(21) Appl. No.: 13/704,114

(22) PCT Filed: Nov. 3, 2011

(86) PCT No.: PCT/EP2011/069315
§ 371 (c)(1),
(2), (4) Date: Feb. 28, 2013

(87) PCT Pub. No.: WO2012/059539
PCT Pub. Date: May 10, 2012

(65) Prior Publication Data
US 2013/0287991 A1  Oct. 31, 2013

(30) Foreign Application Priority Data

Nov. 3, 2010 (DE) .......... 10 2010 043 300
Nov. 3, 2010 (DE) .......... 10 2010 043 345

(Continued)

(51) Int. Cl.
*D04H 11/00* (2006.01)
*D01G 15/00* (2006.01)
(Continued)

(52) U.S. Cl.
CPC .......... *D04H 11/00* (2013.01); *B29C 70/081* (2013.01); *B32B 5/022* (2013.01); *B32B 5/028* (2013.01);
(Continued)

(58) Field of Classification Search
CPC .......... D04H 1/4242; D04H 1/46; D04H 1/74; D01G 11/00; D01G 11/02
(Continued)

(56) References Cited

U.S. PATENT DOCUMENTS 5,536,486 A * 7/1996 Nagata .............. D01F 9/145
264/29.2
5,609,707 A * 3/1997 Bazshushtari .......... D04H 1/42
156/148

(Continued)

FOREIGN PATENT DOCUMENTS

CA   2 789 812 A1   8/2011
CA   2 789 837 A1   8/2011
(Continued)

*Primary Examiner* — Cheryl Juska
(74) *Attorney, Agent, or Firm* — Laurence A. Greenberg; Werner H. Stemer; Ralph E. Locher

(57) ABSTRACT

A nonwoven material is composed of a nonwoven batt of a plurality of bundles formed of carbon fibers. At least some of the bundles have a curved progression that includes a curved vertex area of a first curvature between the bundle ends and at least one bundle end area of a second curvature extending from said one bundle end to the vertex. The first curvature is greater than the second curvature, in particular it is greater by at least 50%.

19 Claims, 3 Drawing Sheets

(30) Foreign Application Priority Data

| Nov. 3, 2010 | (DE) | 10 2010 043 346 |
|---|---|---|
| Nov. 3, 2010 | (DE) | 10 2010 043 347 |
| Nov. 3, 2010 | (DE) | 10 2010 043 349 |
| Jun. 21, 2011 | (DE) | 10 2011 077 879 |
| Jun. 21, 2011 | (DE) | 10 2011 077 880 |
| Jun. 21, 2011 | (DE) | 10 2011 077 881 |
| Jul. 6, 2011 | (DE) | 10 2011 078 739 |
| Jul. 6, 2011 | (DE) | 10 2011 078 741 |

(51) Int. Cl.

| D04H 1/4391 | (2012.01) |
|---|---|
| B29C 70/08 | (2006.01) |
| D04H 1/06 | (2012.01) |
| D04H 1/4242 | (2012.01) |
| D04H 1/4274 | (2012.01) |
| D04H 1/4374 | (2012.01) |
| D04H 1/46 | (2012.01) |
| D04H 1/498 | (2012.01) |
| D04H 1/74 | (2006.01) |
| D04H 3/045 | (2012.01) |
| D04H 5/02 | (2012.01) |
| D01G 1/04 | (2006.01) |
| D01G 7/00 | (2006.01) |
| D01G 13/00 | (2006.01) |
| B32B 5/02 | (2006.01) |
| B32B 5/06 | (2006.01) |
| B32B 7/12 | (2006.01) |
| B29B 11/16 | (2006.01) |

(52) U.S. Cl.
CPC . *B32B 5/06* (2013.01); *B32B 7/12* (2013.01); *D01G 1/04* (2013.01); *D01G 7/00* (2013.01); *D01G 13/00* (2013.01); *D01G 15/00* (2013.01); *D04H 1/06* (2013.01); *D04H 1/4242* (2013.01); *D04H 1/4274* (2013.01); *D04H 1/4374* (2013.01); *D04H 1/4391* (2013.01); *D04H 1/46* (2013.01); *D04H 1/498* (2013.01); *D04H 1/74* (2013.01); *D04H 3/045* (2013.01); *D04H 5/02* (2013.01); *B29B 11/16* (2013.01); *B32B 2250/20* (2013.01); *B32B 2262/0276* (2013.01); *B32B 2262/101* (2013.01); *B32B 2262/106* (2013.01); *B32B 2307/40* (2013.01); *B32B 2307/50* (2013.01); *B32B 2605/08* (2013.01); *Y10T 428/23929* (2015.04); *Y10T 428/23957* (2015.04); *Y10T 428/23964* (2015.04); *Y10T 428/23979* (2015.04); *Y10T 428/23993* (2015.04)

(58) Field of Classification Search
USPC ............. 442/388, 402, 403, 19, 145, 145.7, 98,442/0.6
See application file for complete search history.

(56) References Cited

U.S. PATENT DOCUMENTS

| 5,869,411 | A | * | 2/1999 | Bazshushtari | D04H 1/42 428/408 |
|---|---|---|---|---|---|
| 8,071,205 | B2 | | 12/2011 | Tsuchiya et al. | |
| 2013/0192189 | A1 | * | 8/2013 | Lawrence | D02G 3/16 57/244 |
| 2013/0196154 | A1 | * | 8/2013 | Ortlepp | B29B 9/04 428/357 |
| 2013/0210298 | A1 | * | 8/2013 | Ortlepp | B29B 11/16 442/1 |
| 2014/0245577 | A1 | * | 9/2014 | Sepati | D01G 11/00 28/100 |
| 2014/0303306 | A1 | * | 10/2014 | Kajiwara | C08J 5/042 524/496 |
| 2015/0044438 | A1 | * | 2/2015 | Baser | B32B 5/022 428/212 |

FOREIGN PATENT DOCUMENTS

| DE | 10 2008 004 005 A1 | | 7/2009 | | |
|---|---|---|---|---|---|
| DE | 10 2009 023 529 A1 | | 12/2010 | | |
| DE | 102011079525 A1 | * | 1/2013 | ........... | B29C 70/504 |
| EP | 0 892 101 A1 | | 1/1999 | | |
| GB | WO 2014037724 A1 | * | 3/2014 | ........... | B29C 70/465 |
| IT | WO 2013144844 A1 | * | 10/2013 | ........... | D04H 1/4242 |
| JP | 63-307915 A | | 12/1988 | | |
| JP | 1-040532 A | | 2/1989 | | |
| JP | 2000-054252 A | | 2/2000 | | |
| JP | 4353926 B2 | * | 10/2009 | | |
| JP | 2012184535 A | * | 9/2012 | | |
| WO | 2010/013645 A1 | | 2/2010 | | |
| WO | 2011/095826 A2 | | 8/2011 | | |
| WO | 2011/101093 A2 | | 8/2011 | | |
| WO | 2011/101094 A1 | | 8/2011 | | |

\* cited by examiner

NONWOVEN BATT WITH CURVED CARBON FIBER BUNDLES

BACKGROUND OF THE INVENTION

Field of the Invention

The present invention relates to nonwoven batt or "pile layer," which has a plurality of bundles encompassing carbon fibers, as well as to a method for manufacturing such a carded nonwoven. The invention further relates to a nonwoven or nonwoven material.

Pile layers encompassing carbon fibers are especially well suited as initial structures for manufacturing nonwovens or nonwoven materials, which are used in numerous applications in the automobile industry. They are used above all for manufacturing automobile components. In particular after suitably impregnated with a polymer or resin, for example in an RTM procedure, the nonwovens and nonwoven materials in question are advantageously processed into light, yet mechanically very resilient fiber composite structures, which are increasingly being viewed as a preferred and pioneering material.

Pile formation typically involves supplying single fibers having a predetermined length distribution to a pile forming machine via suitable feeding devices. For example, such a pile forming machine can be designed as a carding machine. Suitable functional components in the pile forming machine intertwine the single fibers, so that a flat structure is formed, to which the intertwined fibers impart enough intrinsic stability to withstand the outer mechanical stresses that arise while continuing to process the pile layers.

In a carding machine, the worker or clearer rollers arranged on a cylindrical container are operated in such a way as to rotate in the opposite direction as the cylindrical container, thereby transporting fibers that had been introduced into the carding machine into a random arrangement of fibers, or intertwining the fibers in this random arrangement.

This repeated processing or turning yields a pile layer that exhibits enough intrinsic stability to be removed from the carding machine without being destroyed, and to subsequently be processed again. The typical carding machine has a structural design roughly corresponding to the specification in DIN 64118.

The pile layers removed from pile forming machines can be processed into nonwoven materials in additional steps. For example, the pile layers can be doubled, i.e., the pile layers can be laid one on top of the other, so as to create a nonwoven with a desired thickness and suitable overall fiber content, which once solidified, e.g., via needling, can be relayed to another processing step as a nonwoven material. Nonwoven materials generally differ from conventional nonwovens in that they have undergone a chemical, mechanical or thermal solidification.

In addition to the mechanical procedures described above, nonwovens can also be generated in aerodynamic manufacturing processes. The fibers, for example after separated, are here fed to an air stream that places them onto a sieve drum or sieve belt. The sieve drum or sieve belt continues to transport the fibers lying in a random arrangement or without any prescribed orientation, while the air is vacuumed off over the sieve openings. Compacted and remaining behind on the sieve after removing the air, the fibers form a nonwoven. Aerodynamic nonwoven forming procedures are especially well suited for processing thicker and less shirred fibers.

Alternatively, nonwovens can also be fabricated in wet manufacturing processes using eluents, such as water, wherein the fibers are suspended in the eluent and fed to a sieve to filter out the eluent during this process. The remaining fiber layer forms the nonwoven, which can be prepared even further in suitable drying steps.

Within the framework of the present invention, no distinction is made between a pile layer and a nonwoven. All of these structures are obtained in a process aimed at intertwining the fibers into a flat structure, which exhibits a desired intrinsic stability. On the other hand, the nonwoven material is distinguished from the nonwoven or pile layer by the subsequent additional step of solidification, as described further above.

The problem with respect to the described procedures is that the single fibers fed to the pile forming machines must typically be subjected to complex mechanical preparation. Used for this purpose are opening and/or mixing units, which break up and prepare the fibers, for example at classic spinning mills. Especially the manufacture of pile layers using carbon fibers also requires a complicated preparation of carbon fibers. For example, the carbon fibers can be removed from carbon fiber strands. To this end, the latter must first be removed from a spool and fed to a cutting device. After cut to a suitable length, the bundles of carbon fibers must be broken up by largely separating the fibers in the bundle sections. Before fed into the pile forming machine, the fibers must also be suitably accumulated and metered into the pile forming process. Only after this step can the fibers be processed into a pile.

However, not only are all of these processing steps relatively cost-intensive, they are also associated with a higher maintenance outlay for the devices in the entire procedural sequence. But it is preparation that becomes especially complicated precisely when processing fiber scraps or recycled fibers, since several additional processing steps also become necessary for breaking up, opening and sometimes even cleaning the fibers, so as to obtain a largely isolated fiber.

In addition, the procedures known from prior art are used first and foremost to generate pile layers that exhibit a random and at most only partially oriented fiber structure. While it is basically possible to still align the fibers in the pile after the fact in a combing step, this again requires another procedural step, which generates costs on the one hand, while on the other hand, a combing step must be applied very carefully so as not to further damage the pile layer.

However, the alignment of fibers is often desired for predetermined applications, since it makes it possible to define one or more mechanical preferred directions in the pile layer. As a consequence, for example, a nonwoven with defined preferred direction(s) can be further processed into a fiber-oriented fiber composite material, and used in applications properly adjusted for load. The fiber composite materials are here used in such a way that the preferred direction(s) of the pile layer are oriented toward the mechanical forces to be absorbed, so as to advantageously absorb the latter. The forces are here preferably directed in the longitudinal direction of the fibers. This is the case in particular for carbon fibers, which exhibit an especially good tensile strength in the longitudinal direction of the fiber.

BRIEF SUMMARY OF THE INVENTION

The object of the present invention is now to propose a pile layer the can be fabricated more cost-effectively than the pile layers known from prior art. In particular, fewer individual operations are to be required for manufacturing a pile layer. According to the invention, this relates to carbon fiber pile layers, which in prior art are still made out of single fibers removed from a tow or roving. Such pile layers are additionally intended to exhibit a suitable orientation of the fibers, so that the pile layer can have one, preferably two or more, preferred directions. In particular, the preferred direction(s) are to allow a fiber composite material provided with a pile layer for reinforcement purposes to also relatively better handle a load toward the preferred direction(s) as well. According to the invention, the preferred direction(s) are provided initially for a pile layer generated by means of a pile forming machine. However, this is not to say that a nonwoven or nonwoven material cannot consist of several such pile layers according to the invention, which can exhibit at least one preferred direction, preferably several preferred directions.

The object of the present invention is further to suggest a manufacturing method for such a pile layer, which produces relatively lower costs, and also requires less technical outlay for preparing the carbon fibers.

In the invention, this object is achieved with a pile layer as claimed, as well as with a manufacturing method as claimed. In addition, the object underlying the invention is achieved with a nonwoven or nonwoven material as claimed.

In particular, the object underlying the invention is achieved by a pile layer exhibiting bundles comprising a plurality of carbon fibers, wherein at least several of the bundles have a curved progression, which exhibits a curved vertex area of a first curvature (K1) between the bundle ends and at least one bundle end area of a second curvature (K2) arranged at the bundle ends, wherein the first curvature (K1) is larger than the second curvature (K2), in particular at least 50% larger.

The possible algebraic signs for the bundle curvatures will here be left out of account. The curvatures only relate to the amount of curvature.

According to the invention, each bundle with a curved progression can exhibit an individual first curvature (K1) or an individual second curvature (K2). However, it also lies within the scope of the invention for a plurality of bundles having a curved progression to exhibit a first curvature (K1) or second curvature (K2) that are uniform within the accuracy of measurement. However, it is essential in each case that a bundle exhibits a curved progression having a first curvature (K1) in the vertex area of the same bundle, and a second curvature (K2) at a bundle end area of the same bundle that is smaller than the first curvature (K1). It is likewise possible for both bundle end areas to exhibit a respective individual second curvature (K2) or also a quantitatively identical second curvature (K2).

The vertex area must here be understood as the area of the bundle that exhibits the largest curvature. The term vertex area will also be explained in the exemplary embodiments yet to be presented below. In particular, the vertex area according to the invention encompasses the point along the progression that has the largest curvature. By contrast, the bundle end area encompasses in particular the point of the respective bundle end.

Within the framework of the present invention, the curvature of a bundle is determined from the averaged directional progression of all fibers in the bundle. For purposes of this determination, the fibers in a bundle are acquired in terms of their individual spatial position, wherein the average position is calculated from comparable sections of individual fibers in the bundle. In particular in areas where the fibers in the bundle are tightly packed over a circular cross section, the average progression essentially corresponds with that of the fiber located in the middle of the bundle in relation to the cross section. However, if the fibers are fanned out, as will sooner typically be the case at the bundle ends, it will be possible to calculate the average progression of the bundle by averaging the layers of all comparable sections of the individual fibers. Based upon established deliberations, the expert can calculate the average so as to determine the average progression.

The curved progression of a bundle typically exhibits different curvatures at varying locations of the bundle. In order to determine a curvature, a predetermined area of the progression is inscribed with a circle in such a way that the circumferential line of the inscribed circle tangentially coincides with the progression of the bundle at the corresponding location. In this regard, the inscribed circle for the vertex area exhibits a smaller radius with a larger first curvature (K1) than does the inscribed second circle for the bundle end area, which has a relatively larger radius but a smaller second curvature (K2).

The solution according to the invention further involves a method for manufacturing a pile layer, which encompasses the following steps: Incorporating bundles encompassing carbon fibers into a carding machine; operating the carding machine in such a way as not to completely isolate the bundles into single fibers, but rather to intertwine carbon fibers in the bundle with additional fibers; removing the pile layer from the carding machine.

The carding process must here be adjusted so as to prevent the bundles introduced into the carding machine from resolving into individual fibers. However, single fibers can here not be entirely prevented from getting into the carding machine along with the bundles. While being introduced, the bundles can be present in a separable form, or already be intertwined with the carbon fibers and/or other fibers. In particular, the bundles can be present in a random arrangement of fibers that has not been solidified or further processed, in which the fibers protrude out of a bundle in a partially isolated manner, and are intertwined with other fibers.

In order to prevent a complete resolution of the bundles in the carding machine, it is possible to adjust the number of turning or working steps, or the distance between the rollers encompassed by the carding machine. In addition, the surface of the individual rollers can be suitably adjusted to prevent the bundles from completely breaking up into single fibers. Also conceivable is a geometric adjustment of the fittings encompassed by the rollers of the carding machine.

In both this conjunction and within the framework of the present patent application, a bundle must be understood as an accumulation of fibers that at least partially progress in an essentially parallel direction, wherein the fiber density in the bundle is at least partially elevated by comparison to the fiber density of the environment. Bundles can in this respect also be visually identified very well, since they stand out from their environment, and in most instances are easily visually identifiable as a bundle. In addition, a bundle can also exhibit a cohesion of single fibers, which safeguards the bundle against falling apart into single fibers when exposed to a mechanical stress.

The advantage to the pile layer according to the invention is that, while the bundles are also encompassed by the pile layer, the fibers are not resolved into single fibers. This imparts a special strength to the pile layer, in particular as relates to a mechanical stress, which acts on the bundles in a longitudinal direction of the fibers. By comparison to isolated fibers that are not further aligned relative to each other, this allows bundles to absorb external forces, e.g., which act on the fiber composite material to be fabricated later and are introduced into the bundles, in the direction of their fiber progression to a significantly better degree without failing.

Due to the curved progression, the bundles also exhibit not only a preferred direction, roughly in the direction of the fiber progression at the bundle end areas, but also roughly in a direction tangential to the vertex area. Therefore, the curved progression ensures that the bundles exhibit not only a preferred direction with respect to force absorption, but also yet another preferred direction deviating from the latter. For example, this makes it possible to fabricate a pile layer that exhibits at least one preferred direction, but in particular at least two preferred directions. Further explanations concerning the above can also be gleaned from the following descriptions to the figures.

Because the fibers introduced into the carding machine are not completely broken up into single fibers while manufacturing the pile layer, but in the process are still moved in the pile layer via targeted carding, the individual bundles in the pile layer are reoriented. The carding process here organizes the bundles in such a way as to give them a curved progression. During the carding process, the individual bundles are captured by the teeth of the fittings for the individual rollers in the carding machine, and moved against the surrounding fibers of the pile layer generated in the carding machine. The shear forces arising in the process cause the bundles to curve against the fibers in their environment. The curved progression here exhibits at least two areas with a different curvature. In addition, the carding process partially breaks up the bundles, wherein individual fibers become intertwined with isolated fibers in the pile layer, but also with the fibers in the bundles.

A particularly advantageous embodiment of the pile layer according to the invention is distinguished by the fact that the orientation of a plurality of curved bundles is essentially identical, meaning that the progression of at least one of the bundle end areas of a curved bundle has an essentially identically oriented progression in comparison to other bundle end areas of other curved bundles. Reference is here again made to the average progression of all fibers encompassed by a bundle.

An identical orientation is achieved in particular when the average directional progression of one of the bundle ends deviates by no more than 10° from the directional progression of a bundle end of another bundle. Intersecting lines running perpendicular to the directional progression of the bundles in their vertex points with the largest curvature preferably also exhibit an essentially identical direction, and can be drawn upon for defining an orientation. An essentially identical orientation is achieved here as well, so long as the directions of these intersecting lines do not vary by more than 10°. By way of support, let reference also be made to the explanations in the figure section with respect to the possible definitions for orientation.

In such an embodiment of a pile layer, it is advantageous that the majority of identically oriented bundles improve the strength-enhancing effect of the pile layer that it can impart to a fiber composite material to be fabricated later by comparison to a less strongly oriented pile layer. The orientation of bundles improves primarily the absorption of force in a direction essentially parallel to the directional progression of the bundle end areas. In addition, the stability in a direction running perpendicular thereto is also improved, since this essentially corresponds to the direction of the averaged fiber progression in the vertex area. In particular, this holds true for the average progression of the bundle in the area that coincides with the largest curvature in the vertex area. While this area does exhibit a curvature, the typically elevated fiber density present there also increases the strength in a tangential direction to the bundle progression.

It can also be provided in an embodiment that the two bundle ends of curved bundles each exhibit a bundle area with a second curvature (K2), wherein in particular the two second curvatures (K2) are smaller than the first curvature (K1), preferably at least 50% smaller. In particular if the two second curvatures (K2) are essentially equal to zero, the orientation-enhancing effect of the bundles is improved even further. This can also be achieved with second curvatures (K2) that are not essentially equal to zero, albeit typically to less of an extent.

In this case, essentially zero is to be construed to mean that the second curvature (K2) is at least 20 times smaller than the first curvature (K1).

It is also conceivable in an embodiment for the first curvature (K1) to be larger than the reciprocal value for the average length of the respective bundle. This ensures an especially suitable curvature of the vertex area, which in particular is larger than a curvature exhibiting a circle whose circumferential line corresponds to the length of the bundle.

An advantageous embodiment of the invention can also provide that at least 50%, preferably at least 90%, especially preferably at least 98% of all bundles in the pile layer exhibit a curved progression. With an increasing level of alignment, an incrementally improved strength can be achieved for the fiber composite material to be subsequently manufactured, which encompasses a liner layer according to the embodiment.

Another embodiment can also provide that the shortest distance between the two bundle ends of one of the curved bundles be smaller than the greatest distance between the vertex area and one of the two bundle ends. As a consequence, the bundle ends exhibit a length sufficient to impart a suitable strength to the pile layer, wherein this can also help improve the strength of the fiber composite material to be subsequently manufactured.

In an embodiment, it is desirable first and foremost that the bundle ends exhibit a largely parallel progression relative to each other, so as to thereby improve the strength-enhancing effect even further. This is because comparatively more fibers point in a direction of the pile layer precisely when the bundle ends exhibit a comparable orientation, thereby making it possible to advantageously improve the strength. An essentially parallel progression is present when the bundle end areas deviate from each other in terms of linear directional progression by at most 20°.

An especially advantageous embodiment can also provide that the second curvature (K2) essentially be 0. Essentially 0 is here to be understood as meaning that the second curvature (K2) differs from the first curvature (K1) by at least a factor of 20, meaning is larger than a curvature calculated based on 20 times the amount of the first curvature (K1). A small second curvature (K2) of this type ensures a good, essentially straight progression of the bundle ends, and makes it possible to impart a suitable strength to the pile layer, wherein the latter also helps to improve the strength of the fiber composite material to be subsequently manufactured.

In an embodiment, it can also be provided that a surface section of 4 cm$^2$ has no fewer than 3 bundles. This gives the pile layer an advantageous strength, which can also help improve the strength of the fiber composite material to be subsequently manufactured. In particular since the curved bundles are especially suited for a directed absorption of force, the directed absorption of force can take place in an improved manner in the fiber composite material to be subsequently manufactured.

Another embodiment of the present invention can also provide that the plurality of bundles encompassing carbon fibers be no longer than 15 cm, and in particular no longer than 10 cm. As the length incrementally shortens, the relative bundle content in the pile layer can be improved while keeping the fiber content constant. However, requirements may here also necessitate that the bundles exhibit sections having a suitable orientation in preferably one predetermined direction, so as to achieve a direction-specific improvement in strength. However, this also requires that the curved bundles not drop below a minimum length, since the strength-enhancing effect is otherwise inadequate. In another embodiment, it may thus be advantageous for the curved bundles not to dip further below a lower length of about 2 cm.

In an embodiment, it is also possible for a share of at most 5% of all fibers encompassed by a pile layer to exhibit a length exceeding 15 cm. It is sometimes desirable in particular for the fibers to exhibit a distribution that also encompasses a number of fibers longer than 15 cm, since this makes it possible to also use recycling procedures for obtaining and providing fibers, which are unable to ensure that the fibers will be universally shortened to less than 15 cm.

In an embodiment, it can also be provided that the average bundle lengths of the curved bundles in the pile layer preferably vary by at least 100%, or even by more than 200%. Also conceivable are embodiments in which the average bundle lengths vary by at least 500%. In particular, both embodiments relate to the plurality of curved bundles in the pile layer. Varying the bundle length also makes it possible to provide bundles in a pile layer that did not go through any further size selection process before introduced into the carding machine. For example, bundles originating from a recycling process not involving any further size selection can be processed into a pile layer according to the embodiment. Carbon fiber structures can be prepared in such recycling processes, but without any size selection taking place. As a result, carbon fiber structures can be cut randomly, so that while a maximum length can be ensured, the fiber length distribution or bundle length distribution is not adjusted any further to reduce the manufacturing outlay.

Another embodiment can also provide that the curved bundles exhibit a plurality of carbon fibers, which protrude out of the bundle, and are intertwined with other fibers that are not encompassed by the bundle. While this elevates the anchoring of the bundle in the pile layer on the one hand, it also increases the fiber content of the pile layer in the environment of the curved bundles on the other. This makes it possible to advantageously improve the strength of the pile layer and fiber composite material subsequently manufactured out of it.

Another embodiment of the invention can also provide that carbon fibers protruding from the bundle exhibit a length measuring at most 50% of the bundle length. This ensures that the fibers still become sufficiently anchored in the curved bundles.

Another embodiment can also provide that the pile layer exhibit carbon layers that are not encompassed by a curved bundle, and which have a length not exceeding 1 cm, in particular not exceeding 0.5 cm. Accordingly, the pile layer also encompasses relatively short staple fibers, which can be distinctly shorter than the plurality of the bundles encompassed by the pile layer. This embodiment can also provide that the fibers be obtained from a recycling process, which does not prepare the fibers or bundles with respect to their fiber length. This makes it possible to also use recycling processes to prepare the fibers, which generate relatively short fibers, i.e., are not especially gentle in preparing a textile to be processed. Even so, the preparation must ensure that the bundles encompassed by the textile are not completely broken open, meaning separated into single fibers. For example, this can be achieved by way of a suitable treatment duration or a suitably adjusted treatment intensity.

A preferred embodiment can also provide that a number of curved bundles encompass at least 200, preferably at least 500, and especially preferably at least 1000 carbon fibers. The number according to the embodiment relates in particular to a plurality of the curved bundles in the pile layer. As a consequence, the directionally dependent strength of the pile layer can be suitably adjusted, for example to impart a predetermined directionally dependent strength to the fiber composite material to be subsequently manufactured. In addition, this makes it possible to use carbon fiber textiles from a recycling process, which typically exhibit strands comprising 2000 or more fibers per strand. In a suitable preparation process, the bundles encompassed by a textile to be reused are prepared in such a way as to break open the strands to a minimum number of fibers. By subsequently being processed in a carding machine, the bundles can in part be broken up even further, but not to more of an extent than to leave behind a number of fibers in the pile layer according to the embodiment.

An especially preferred embodiment can provide that a pile layer exhibit a mass per unit area (weight per unit area) of at most 50 g/m$^2$, and no less than 10 g/m$^2$, preferably between 35 g/m$^2$ and 25 g/m$^2$. Such pile layers are especially desired in particular in the automobile industry, since they exhibit a sufficient strength in the fiber composite material to be subsequently manufactured, while allowing a very large reduction in the weight of the component. In particular the masses per unit area according to the embodiment enable an efficient use of the valuable raw material, carbon fibers, while at the same time ensuring compliance with the minimal requirements placed on strength. Therefore, the ratio between required strength and the present weight is especially advantageous.

The object underlying the present invention is also achieved in an embodiment involving a nonwoven or nonwoven material, which exhibits at least two pile layers according to one of the embodiments of the pile layer described above or even below, and which in particular are needled together. By processing at least two pile layers into a nonwoven or nonwoven material, the strength-enhancing properties of the pile layers can be improved yet again. In particular, the direction or orientation-related advantages can be tailored to each other by suitably orienting the at least two pile layers in relation to each other. For example, the one pile layer can be arranged in the nonwoven or nonwoven material with a first orientation, while the second pile layer is arranged relative to another, second orientation that differs from the first orientation. The latter makes it possible to define several preferred directions within a nonwoven or nonwoven layer. The curved bundles can here be fixed relative to each other by needling the at least two pile layers. The present invention is intended to prevent the bundles from breaking up into single fibers as the result of needling.

Another preferred embodiment of the nonwoven material can also provide that it exhibit a pile layer according to the embodiments described previously, which is needled for solidification purposes. Needling causes the fibers encompassed by the pile layer to become further intertwined, in particular intertwined on a local level, thereby producing a local solidification. If the pile layer is needled with a sufficient number of sufficiently dense stitches, a distinctly improved strength can be imparted to the entire pile layer structure.

Another embodiment of a nonwoven or nonwoven material can also provide that the orientation of the curved bundles in a pile layer deviate from the orientation of the curved bundles in another pile layer by at least 5°, in particular differing by an angle of 15°, 30°, 45°, 60°, 75° or 90°. In particular, this makes it easy to generate preferred directions within the nonwoven or nonwoven material with a defined angular deviation. This proves very advantageous within the framework of processing in automotive vehicle construction, since the preferred directions can be suitably tailored relative to the applications.

Another embodiment of the invention can also provide that at least two pile layers are needled together or one pile layer is needled for solidification purposes, wherein on average at least 1 needling puncture, preferably at least 5 needling punctures, are present on an area of 1 cm$^2$. The designated area relates to the area of the pile layer or pile layers processed via needling, which preferably represents the entire area of the pile layer or pile layers. Introducing the needling punctures solidifies the pile layer or pile layers on the one hand, so as to improve handling thereof. The needling process here produces above all a local solidification, as already explained above. Due to the selected density of the needling punctures, the embodiment ensures that the number of local solidifications is high enough to yield a solidification that extends over the entire selected area of the pile layer(s). This becomes possible in particular when, given a uniform distribution of the pile layer or pile layers into respective subunits of 1 cm$^2$, each subunit exhibits the number of needling punctures according to the embodiment. In addition, the needling punctures provide a sufficient number of openings in the pile layer or pile layers to enable a more efficient impregnation with a liquid resin or a polymer. This is because the openings make it possible to efficiently relay the resin or polymer over the entire needling thickness, and hence, as stipulated in the embodiment, over the entire thickness of the pile layer(s). This reduces the impregnation time for one, and hence also the manufacturing time for components that encompass the pile layer(s).

A further aspect of the solution to the object of the invention can also provide that a resin-impregnated component exhibit a pile layer described above, or a nonwoven described above, or a nonwoven material described above, wherein the component is designed in particular as a vehicle component. Such components can exhibit the described pile layers, nonwovens or nonwoven materials separately or in conjunction with other textile structures. In particular, it is possible for the described pile layers, nonwovens or nonwoven materials to be encompassed by the component in conjunction with a structure and/or a fabric, wherein the structure and/or fabric is furnished primarily to absorb loads. It is further also possible for the components of a vehicle exhibiting the described pile layers, nonwovens or nonwoven materials not to be provided to ensure the passive safety of a vehicle. In particular, these components are preferably designed as parts of the outer skin of a vehicle. The component can be impregnated with resin, wherein a complete impregnation or even just a partial impregnation can be achieved. In addition, the resin-impregnated component can be hardened. The resin impregnation according to the embodiment must also include a suitable polymer impregnation.

Various embodiments of the pile layer, nonwoven or nonwoven material and the manufacturing process for fabricating a pile layer according to the invention will be used below to explain the invention in detail based on figures. The depicted embodiments do not represent a limitation with respect to the entirety of the claimed invention. In particular, the features claimed below are each respectively being claimed both in isolation and in conjunction with the features described above. As a consequence, every technically possible combination of features that is suitable from the standpoint of the present invention is here being claimed.

Additional embodiments may be gleaned from the subclaims.

Shown on:

DESCRIPTION OF THE INVENTION

For the sake of completeness, let it be noted at this juncture that the embodiments shown on the figures are only schematic representations. In particular the dimensions and proportions for a specific object of the invention can deviate from those in the illustrations depicted.

Figure 1:
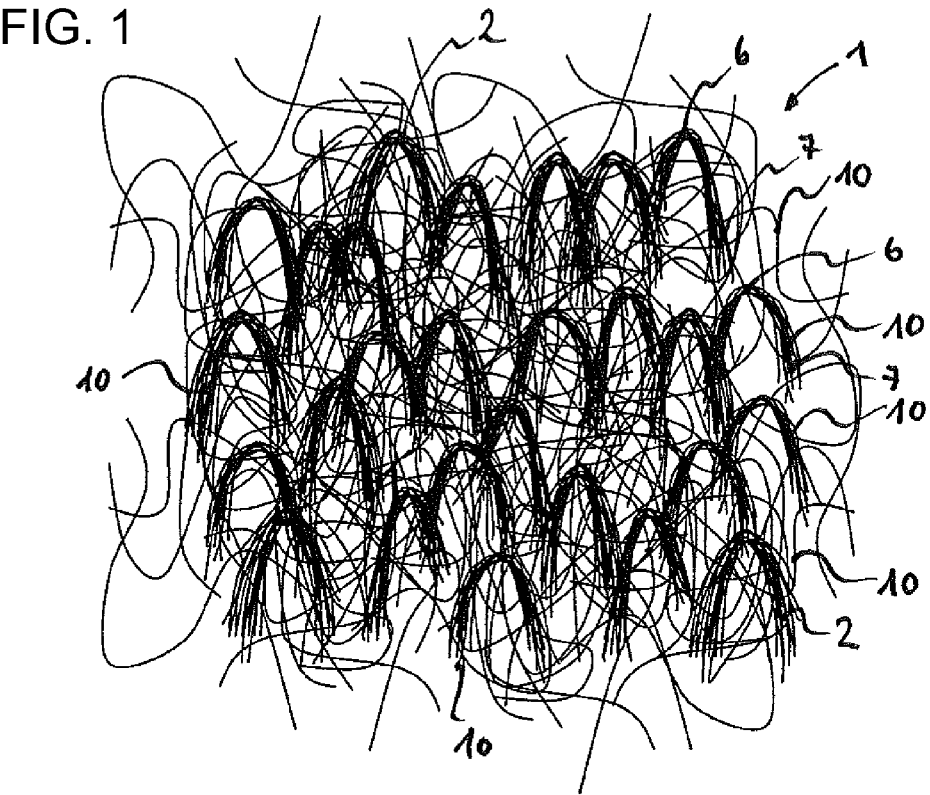
FIG. 1 is a first embodiment of a pile layer according to the invention, top view.

FIG. 1 presents a first embodiment of a pile layer 1 according to the invention with a plurality of bundles 2 that encompass carbon fibers 10. The bundles 2 exhibit a vertex area 6 as well as two bundle end areas 7 each. The terms vertex area 6 and bundle end area 7 are explained in greater detail on FIG. 3.

In evidence is the plurality of curved bundles 2, which are anchored in the pile layer 1 by means of isolated fibers. The fibers can here be encompassed in part by the pile layer 2, and in part by the curved bundles 2. Therefore, the pile layer 2 consists of intertwined fibers, which are either not, or partially or completely encompassed by the curved bundles 2. In this way, intertwining the fibers makes it possible to build a flat structure, the pile layer 1, which is stable enough during exposure to outside mechanical influences to be further processed, for example in a subsequent treatment process.

In an embodiment, the bundles 2 each exhibit a percentage of carbon fibers 10, and can even consist entirely of carbon fibers 10 according to other embodiments. In like manner, the fibers isolated in the pile layer 2 can consist partially or even completely of carbon fibers 10. The percentage of carbon fibers 10 here depends in particular on the strength requirements to be placed on the pile layer 1.

As readily discernible, all bundles 2 exhibit an essentially aligned orientation, i.e., the vertex areas 6 for all bundles 2 point upward in the illustration, while the bundle end areas 7 in the illustration point downward or at a downward inclination. In other words, the vertex areas 6 point to one side of the pile layer 1, while the bundle end areas 7 point to the opposite side of the pile layer 1. According to this orientation, the bundle end areas 7 of the individual bundles 2 essentially run parallel to each other, or are essentially identically oriented, meaning all point to one side of the pile layer 1. However, the pile layer 1 exhibits a high percentage of fibers as a result, preferably a high percentage of carbon fibers 10, which has a preferred direction in terms of its fiber orientation. The preferred direction is also explained in more depth on FIG. 3, but in the present exemplary embodiment could be regarded as moving from the top down in the illustration, for example.

The curvature of individual bundles 2 also causes a percentage of fibers, preferably a percentage of carbon fibers 10, to run essentially perpendicular to this first preferred direction. For example, at least a percentage of the fibers in the bundles 2 run horizontally in the depicted arrangement of bundles 2 in the vertex area of the bundles 2, thereby defining another preferred direction, which essentially runs perpendicular to the first preferred direction described above. However, the pile layer 1 as a result exhibits at least two preferred directions that are independent of each other, which can impart a special strength to the pile layer in these preferred directions, in particular if the pile layer 1 is integrated into a fiber composite material.

Figure 2:
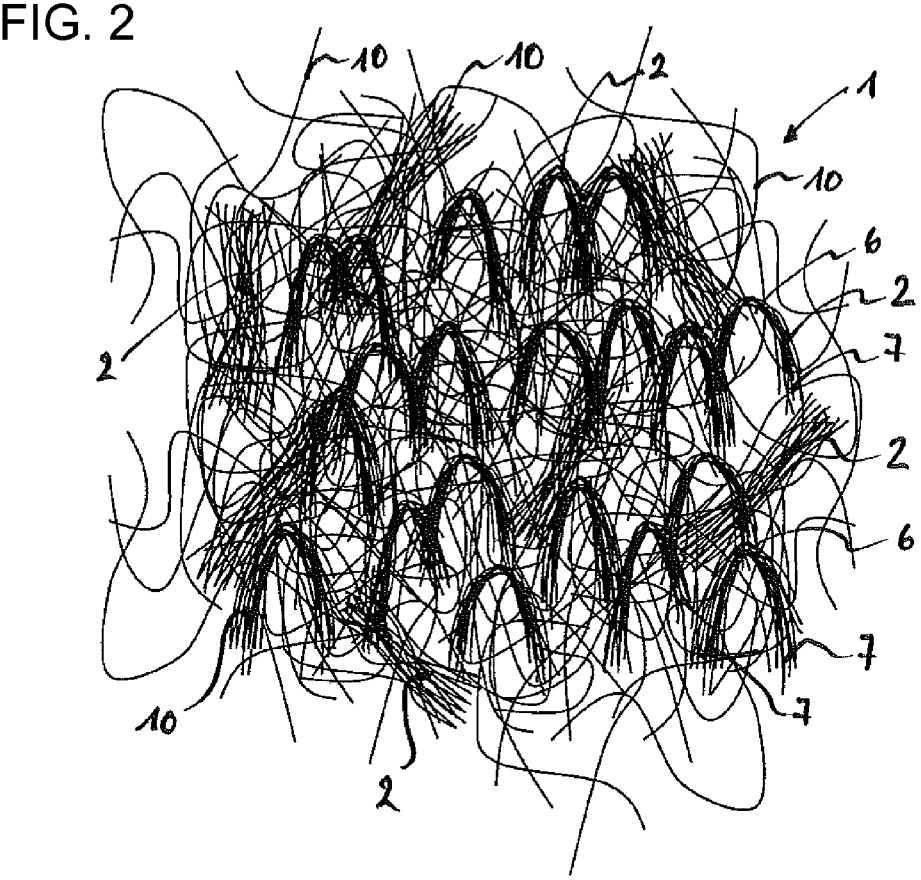
FIG. 2 is a second embodiment of a pile layer according to the invention, top view.

FIG. 2 presents a second embodiment of a pile layer 1 according to the invention, which differs from the embodiment shown on FIG. 1 in that not all of the bundles 2 encompassed by the pile layer 1 exhibit a curved progression according to the invention. Rather, isolated bundles have a progression that is not defined in any greater detail or approximately straight. In particular, these bundles have no vertex area 6 that could exhibit a curvature differing from the curvature of the bundle end areas 7 within the meaning of the invention.

However, in the depicted embodiment, the pile layer 1 can also encompass those types of bundles 2 that exhibit no curved progression. The ratio of curved bundles 2 within the meaning of the invention to the remaining non-curved bundles 2 can be freely determined. However, it is preferred that the number of curved bundles 2 be higher than the number of non-curved bundles 2. In particular, the number of curved bundles 2 exceeds that of the non-curved bundles by 85%, preferably by 90%, especially preferably by 98%.

The non-curved bundles 2 can exhibit a composition comparable to the curved bundles 2, but do not have to. In particular, it is possible for some bundles 2 to be curved more than others during the carding process to generate a pile layer 2 according to the embodiment. If individual bundles 2 are not or just barely curved, it is possible for them to exhibit a progression that deviates from a curved progression according to the invention. Based on the embodiment, it is also possible for the curved bundles 2 and non-curved bundles 2 alike to originate from the same fiber source, but exhibit a different progression in the pile layer 2 to be fabricated within the framework of being processed in a carding machine.

Figure 3:
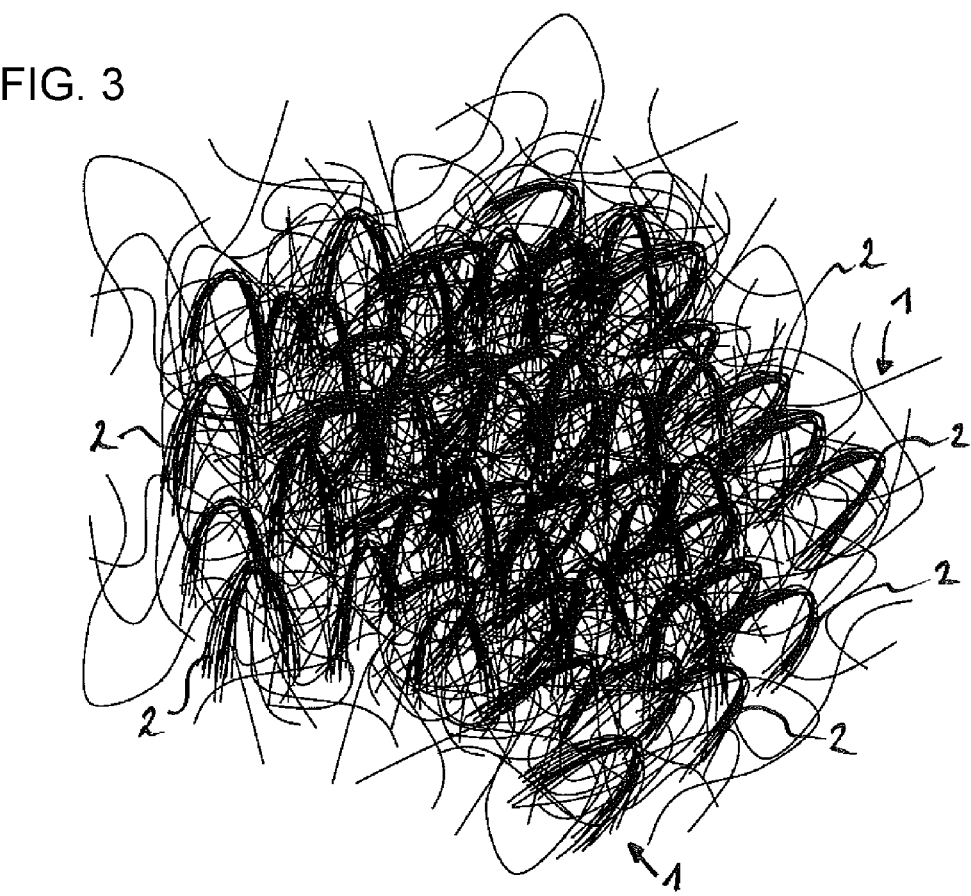
FIG. 3 is a first embodiment of a nonwoven material according to the invention, top view.

FIG. 3 shows a first embodiment of a nonwoven or nonwoven material according to the invention, which consists of two plies of a pile layer 1 fabricated through doubling. If a nonwoven fabric is present, the latter can have been solidified by needling the two plies of the pile layers 1. In an embodiment, the two pile layers 1 are arranged relative to each other in such a way that their respective preferred directions are turned by a specific angle in relation to one another. In this way, the strength-enhancing properties that may be derived from the preferred directions of the individual pile layers 1 can be adjusted in a directionally specific manner. A relative arrangement can here preferably involve turning by an angle of 15°, 30°, 45°, 60°, 75° and 90°. In the present case, the relative arrangement of the two pile layers 2 has them turned by about 45° relative to each other.

Figure 4:
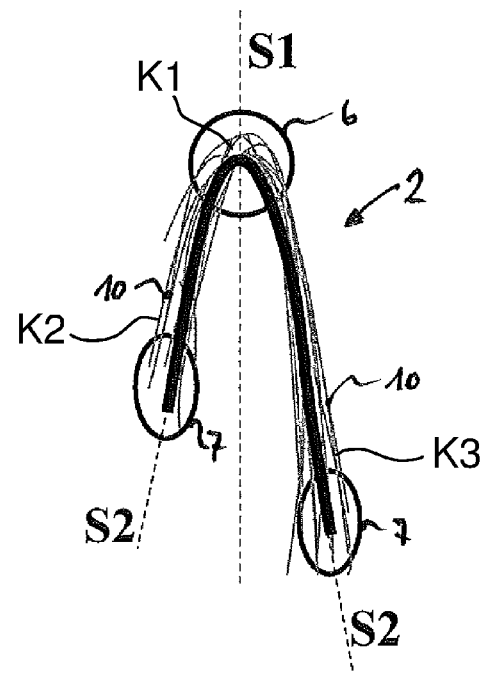
FIG. 4 is a bundle with a curved progression, for example of the kind that can be encompassed by one of the embodiments of the pile layers or nonwoven materials described above.

FIG. 4 presents a bundle 2 with a curved progression, for example of the kind that can be encompassed by one of the embodiments for the above pile layers 1, nonwovens or nonwoven materials. The bundle 2 itself encompasses a number of carbon fibers 10, but these are here depicted schematically in only a small number. In addition, the fibers are only shown in grey for better visual differentiation. The bundles 2 preferably exhibit at least 200 carbon fibers 10, in particular 500 carbon fibers 10, and especially preferably at least 1000 carbon fibers 10. The bundle 2 has a vertex area 6 situated between the two bundle ends. The two bundle ends are encompassed by a bundle end area 7. Both the vertex area 6 and the bundle end areas 7 are schematically illustrated by an oval in the drawing.

The progression of the bundle 2 is denoted by a solid, bolded line. In order to calculate the progression, the sites of mutually corresponding areas of the individual fibers are averaged together so as to determine an average site.

The precise calculation depends on the selection of individual fiber sections, or on the averaging procedure used. However, the differences that arise within the framework of these calculations are insignificant, provided a uniform basis of calculation is used for all bundles 2. Several procedures are possible, wherein they must be in keeping with a technically logical process. In particular, the average bundle progression must not contradict the rough bundle progression as estimated with the naked eye.

It is also not all that important with respect to the present invention how the vertex areas 6 and bundle end areas 7 are individually determined, provided the latter are ascertained in a technically logical manner, and do not conflict with the idea underlying the present invention. For example, for determining a vertex area 6, it makes sense in particular to select a narrow area around the point of the bundle progression that exhibits the largest curvature. A narrow area can here encompass roughly between 2% and 10% of the entire bundle length. In like manner, it makes sense to determine a bundle end area 7 that also encompasses the respective bundle ends. The bundle end area 7 can also encompass between 2% and 10% of the overall bundle length. However, stipulations deviating from the above may also be reasonable.

Several rational approaches for determination can be used in ascertaining the orientation of a bundle 2. For example, the orientation of a bundle can be determined by running an intersection line (S1) through the vertex area 6 in such a way that the intersection takes place perpendicular to the progression of the vertex area 6, wherein the intersection passes through the point of the vertex area that exhibits the largest curvature. As a result, the progression of the intersection lines (S1) ascertained in this way corresponds to the orientation of the bundle 2. However, the point of intersection can also be selected in such a way that the intersection line (S1) divides the bundle into two sectional areas. The sectional areas are here composed of individual flat partial segments (here not shown in detail), which respectively lie opposite each other in relation to the intersection line (S1) on the left and right of the intersection line (S1). If the partial segments are now selected in such a way that the directly opposing partial segments are coextensive or do not deviate from each other by more than 5%, for example, the intersection line (S1) can be suitably determined. It is here possible that determining the progression of the intersection line (S1) involves differentiating the size exhibited by the individual partial segments. As an alternative to the method described above, the orientation can also correspond to the linearized progression of a bundle end 7, wherein the progression of a bundle end 7 is determined by a linear regression in the bundle end area 7 (see the two straight lines S2). The orientation preferably also corresponds to the progression of a straight line (roughly corresponding to the intersection lines S1), which intersect the two straight lines S2 determined in this way in their point of intersection in such a way as to halve the angular region between the two straight lines (S2) determined in this way.

The orientation of a bundle 2 preferably corresponds to the directional progression of a straight line marked S1. The orientation of a pile layer 1 exhibiting this type of bundle 2 can then be determined by averaging all of these individual orientations.

As already noted above, the exact determination of orientation is not important, provided a sensible and uniform procedure is used for ascertainment purposes.

Figure 5:
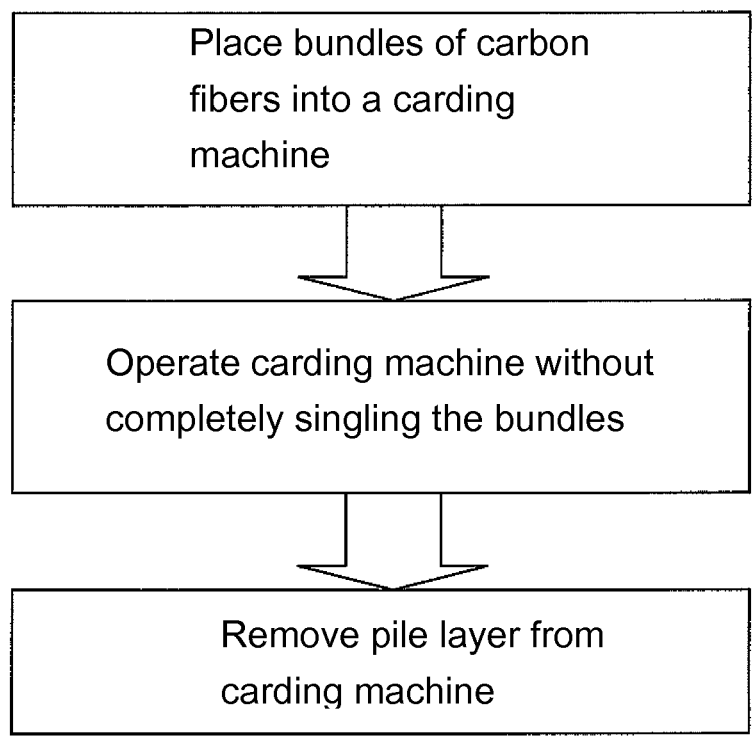
FIG. 5 is a flowchart for illustrating the sequence of individual steps, which are encompassed by an embodiment of the manufacturing method according to the invention.

FIG. 5 relates to a flowchart for illustrating the progression of individual steps, which are encompassed by an embodiment of the method according to the invention. Based on the latter, it is necessary that an embodiment of the method for manufacturing a pile layer 1 encompass the following steps: Introducing bundles 2 encompassing carbon fibers 10 into a carding machine; operating the carding machine 20 so as to not completely isolate the bundles 2 into single fibers, while still intertwining carbon fibers 10 in the bundle 2 with other fibers 10 in the pile layer 1; removing the pile layer 10 from the carding machine.

In a further embodiment of the manufacturing method, the pile layers 1 can also be processed into nonwovens or nonwoven materials. Needling, stitching or knitting can also be considered for solidifying several pile layers 1 laid on top of each other. The curved bundles 2 encompassed by the pile layers 1 must here only be partially damaged, if at all.

REFERENCE NUMBERS 1 nonwoven batt
2 Bundle
6 Vertex area
7 Bundle end area, bundle end
10 Carbon fiber
20 Carding machine
K1 First curvature
K2 Second curvature
K3 Third curvature

The invention claimed is:

1. A nonwoven, comprising:
a plurality of bundles encompassing carbon fibers, said bundles having bundle ends;
at least some of said bundles having a curved progression with a curved vertex area of a first curvature between said bundle ends, and at least one bundle end area of a second curvature extending from a bundle end to the vertex;
said first curvature being greater in value than said second curvature.

2. The nonwoven according to claim 1, wherein a value of said first curvature is greater than a value of said second curvature by at least 50%.

3. The nonwoven according to claim 1, wherein an orientation of a plurality of said curved bundles is substantially identical, with a progression of at least one of the bundle end areas of a curved bundle having an essentially identically oriented progression in comparison with other bundle end areas of other curved bundles.

4. The nonwoven according to claim 1, wherein said two bundle ends of curved bundles each exhibit a bundle end area with a second curvature, and wherein the two second curvatures are smaller than said first curvature.

5. The nonwoven according to claim 1, wherein at least 50% of all of said bundles in the nonwoven exhibit said curved progression.

6. The nonwoven according to claim 1, wherein said second curvature is substantially zero.

7. The nonwoven according to claim 1, wherein said plurality of bundles encompassing said carbon fibers is no longer than 15 cm.

8. The nonwoven according to claim 1, wherein average bundle lengths of said curved bundles in said pile layer nonwoven vary by at least 100%.

9. The nonwoven according to claim 1, wherein a plurality of said curved bundles have at least 200 carbon fibers.

10. The nonwoven according to claim 1, comprising a mass per unit area of at most 50 g/m$^2$ and no less than 10 g/m$^2$.

11. The nonwoven according to claim 1, wherein the mass per unit area of the nonwoven lies between 25 g/m$^2$ and 35 g/m$^2$.

12. A resin-impregnated component, comprising a nonwoven according to claim 1 formed into a motor vehicle component.

13. A nonwoven material, comprising at least two nonwovens according to claim 1 needled together.

14. A nonwoven material, comprising a nonwoven according to claim 1, which is needled for solidification purposes.

15. The nonwoven material according to claim 13, wherein an orientation of said curved bundles in one said nonwoven deviates from an orientation of said curved bundles in another said nonwoven by at least 5°.

16. The nonwoven material according to claim 13, wherein an orientation of said curved bundles in one said nonwovens deviates from an orientation of said curved bundles in another said nonwoven by an angle selected from the group consisting of at least 15°, at least 30°, at least 45°, at least 60°, at least 75°, and at least 90°.

17. The nonwoven material according to claim 13, wherein at least two nonwovens are needled together or one nonwoven is needled for solidification purposes, with, on average, at least one needling puncture within an area of 1 cm$^2$.

18. A resin-impregnated component, comprising a nonwoven material according to claim 13 formed into a motor vehicle component.

19. A method for manufacturing a nonwoven, the method which comprises:
incorporating curved bundles encompassing carbon fibers into a carding machine, the curved bundles having a curved progression with a curved vertex area of a first curvature between said bundle ends and a bundle end area with a second curvature extending from a bundle end to the vertex, wherein said first curvature is greater in value than said second curvature;

operating the carding machine in such a way as not to completely isolate the bundles into single fibers, but rather to intertwine carbon fibers in the bundle with additional fibers; and removing the nonwoven from the carding machine.

* * * * *